US008235334B1

(12) United States Patent  (10) Patent No.: US 8,235,334 B1
Kobal  (45) Date of Patent: Aug. 7, 2012

(54) TABLET COMPUTER HOLDER AND SUPPORT

(76) Inventor: Mark Kobal, Prague (CZ)

( * ) Notice: Subject to any disclaimer, the term of this patent is extended or adjusted under 35 U.S.C. 154(b) by 70 days.

(21) Appl. No.: 13/029,109

(22) Filed: Feb. 16, 2011

(51) Int. Cl.
A47F 5/00 (2006.01)

(52) U.S. Cl. ............... 248/122.1; 248/176.3; 248/177.1; 248/274.1; 248/346.07

(58) Field of Classification Search ................. 248/121, 248/122.1, 133, 176.3, 177.1, 274.1, 346.072
See application file for complete search history.

(56) References Cited

U.S. PATENT DOCUMENTS

| | | | |
|---|---|---|---|
| 1,754,006 A | | 8/1925 | Anderson |
| 3,137,953 A * | | 6/1964 | Foster ............................... 38/30 |
| 3,372,690 A * | | 3/1968 | Ruiz .............................. 126/261 |
| 3,512,620 A * | | 5/1970 | Bell et al. ......................... 190/11 |
| 3,596,866 A * | | 8/1971 | Baker ........................... 248/461 |
| 3,858,592 A * | | 1/1975 | Rickenbaker ................. 132/288 |
| 4,465,255 A * | | 8/1984 | Hill ............................. 248/441.1 |
| 4,733,836 A | | 3/1988 | Barnes |
| 4,842,174 A | | 6/1989 | Sheppard et al. |
| 4,934,549 A * | | 6/1990 | Allen ........................... 220/4.24 |
| 5,513,829 A * | | 5/1996 | Hodges ......................... 248/670 |
| 5,630,566 A | | 5/1997 | Case |
| 5,673,628 A * | | 10/1997 | Boos ............................... 108/44 |
| 5,699,988 A | | 12/1997 | Boettger et al. |
| 5,704,505 A | | 1/1998 | Singh |
| 5,769,369 A * | | 6/1998 | Meinel ........................ 248/176.1 |
| 5,913,502 A | | 6/1999 | Smith |
| 6,032,910 A | | 3/2000 | Richter |
| 6,076,787 A * | | 6/2000 | Troyer ............................ 248/166 |
| 6,260,486 B1 * | | 7/2001 | Boos et al. ........................ 108/42 |
| 6,305,653 B1 * | | 10/2001 | Oldham et al. ............. 248/177.1 |
| 6,327,982 B1 | | 12/2001 | Jackson |
| 6,585,212 B2 * | | 7/2003 | Carnevali ................. 248/346.07 |
| 6,796,536 B1 * | | 9/2004 | Sevier, IV ..................... 248/121 |
| 6,840,485 B2 | | 1/2005 | Richter |
| 7,032,872 B2 * | | 4/2006 | Sullivan ................... 248/346.07 |
| 7,258,321 B1 | | 8/2007 | Storrs |
| 7,320,450 B2 | | 1/2008 | Carnevali |
| 7,431,254 B2 | | 10/2008 | Cheng |
| 7,593,218 B2 | | 9/2009 | Hwang et al. |
| 7,597,302 B2 | | 10/2009 | Lee et al. |
| 7,600,728 B2 * | | 10/2009 | Petrick et al. .............. 248/286.1 |

(Continued)

FOREIGN PATENT DOCUMENTS

WO  WO2009040848 A1  4/2009

*Primary Examiner* — Terrell McKinnon
*Assistant Examiner* — Daniel J Breslin
(74) *Attorney, Agent, or Firm* — Louis Ventre, Jr.

(57) ABSTRACT

A foldable support for a tablet computer or other object is an upright, self-standing or anchorable device. A base having foldout wings is adapted to be rotated in place and anchored under the legs of a person in a seated position, or under the person's torso for a reclining or supine person. The support includes a body with a recessed portion into which the base is attached about a horizontal axle to enable the rotation. Two arms are rotatably pinned together with the other ends attached to ball joints on the body and a receptacle. The receptacle holds the tablet computer or other object and includes a frame housing with rotatably attached rods that extend outwardly from side openings in the frame. A gripper is mounted to the far end of each rod to hold the corners or edges of the tablet computer or other object mounted between the grippers.

6 Claims, 9 Drawing Sheets

U.S. PATENT DOCUMENTS

| | | |
|---|---|---|
| 7,611,112 B2 * | 11/2009 | Lin .................. 248/274.1 |
| 7,628,365 B2 | 12/2009 | Lee |
| 7,922,137 B2 * | 4/2011 | Derry et al. ............ 248/274.1 |
| 8,066,241 B2 * | 11/2011 | Yu et al. .............. 248/286.1 |
| 8,089,750 B2 * | 1/2012 | Chen et al. ............ 361/679.26 |
| 2002/0017595 A1 | 2/2002 | Koyanagi |
| 2005/0263666 A1 | 12/2005 | Kim |
| 2006/0175477 A1 | 8/2006 | Parsons |
| 2006/0196998 A1 * | 9/2006 | Matteo ................ 248/176.3 |
| 2006/0261227 A1 * | 11/2006 | Petrick et al. ........... 248/276.1 |
| 2007/0040077 A1 | 2/2007 | Baek et al. |
| 2007/0040089 A1 * | 2/2007 | Shiff .................. 248/448 |
| 2007/0120034 A1 | 5/2007 | Sparling |
| 2007/0272809 A1 | 11/2007 | Jang |
| 2008/0029663 A1 * | 2/2008 | Derry et al. ............ 248/178.1 |
| 2008/0111044 A1 | 5/2008 | Gauer |
| 2008/0192417 A1 | 8/2008 | Hwang et al. |
| 2009/0127418 A1 * | 5/2009 | Wang .................. 248/310 |
| 2010/0078536 A1 | 4/2010 | Galvin |
| 2010/0084522 A1 | 4/2010 | Zhou et al. |
| 2010/0096518 A1 | 4/2010 | Wang et al. |
| 2010/0108829 A1 | 5/2010 | Zhou |

* cited by examiner

TABLET COMPUTER HOLDER AND SUPPORT

TECHNICAL FIELD

In the field of supports, a pedestal-type device is self-standing, foldable, portable and upright with an adjustable receptacle to hold and support a tablet computer or other object in a tiltable position above a seated or reclining person and at a distance above a generally horizontal surface underneath the seated or reclining person, such as a chair, couch, bed, floor or ground.

BACKGROUND ART

Support pedestal devices are often little more than horizontal platforms above the floor. There are devices for a supine person, but these generally straddle the person, are not foldable to a compact state, are unstable with a larger device like a tablet computer, are not self-supporting in that they require securing to a fixed object, are unsuitable for a seated person, or do not provide the scope of adjustability often desired for viewing and manipulating the object that is supported.

SUMMARY OF INVENTION

A support for a tablet computer, book or other object includes a base with two foldout wings. A person sits or lies on the wings and the tablet computer, book or other object is steadied in place in an adjustable position in front of the person. The support is foldable into a compact state and includes a body with a recessed portion into which the base is attached about a horizontal axle that enables the base to be rotated between an approximate vertical storage position within the recess and an approximate horizontal deployed position perpendicular to the vertical aspect of the body and adjacent to the bottom side of the body. The wings in the base may be mounted on two separate shafts forming axles. The wings may be configured to lock into a folded out position when the shafts are slid into the body after the base is rotated to the approximate horizontal position. The support includes a first arm and a second arm rotatably pinned together at a pin joint with the other ends attached to ball joints: one on the body and one on a receptacle. The receptacle includes a rotatable frame housing with attached rods that extend outwardly from side openings in the frame. A gripper is mounted to the far end of each rod; the gripper holds the corners or edges of a tablet computer or other object mounted between grippers. The rods in the receptacle may be telescoping and adapted to lock in position. The rods may be spring biased to pull the grippers inward against the corners of the tablet computer, book or other object. The gripper may include an el-shaped brace rotatably attached at the end of the rod and an elastic cord, which is suited to engage a corner of the tablet computer, book or other object. The base may include a handle formed by a member connecting the separate shafts. Optionally, a bracket is attached to the rear side of the body to hold the two arms when removed from the ball joints.

ADVANTAGEOUS EFFECTS OF INVENTION

The support is a pedestal-type device to hold a tablet computer or other object in close proximity to a seated or supine person using the tablet computer, book or other object. The support is self-standing and is preferably anchored in place by the body of a person so that it remains closely aligned with the person's body. Anchoring also enables positioning the support at the right place for use by the person because the support's center of gravity can be shifted outside the footprint of its base.

The support comprises folding elements to compactly reconfigure the support into a convenient shape and size for carrying it to any desired location. Thus, the folding elements enhance the portability of the support.

The support is upright in use with a fully adjustable receptacle to hold and support the tablet computer or other object. It can be adjusted for desired distance from the person; for length, width and thickness of the object being held; and for orientation in three dimensions. Such universal adjustability provides a support adaptable to hold a broad spectrum of objects at perfect placement for each individualized user's comfort.

BRIEF DESCRIPTION OF DRAWINGS

The drawings illustrate preferred embodiments of the invention and the reference numbers in the drawings are used consistently throughout.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
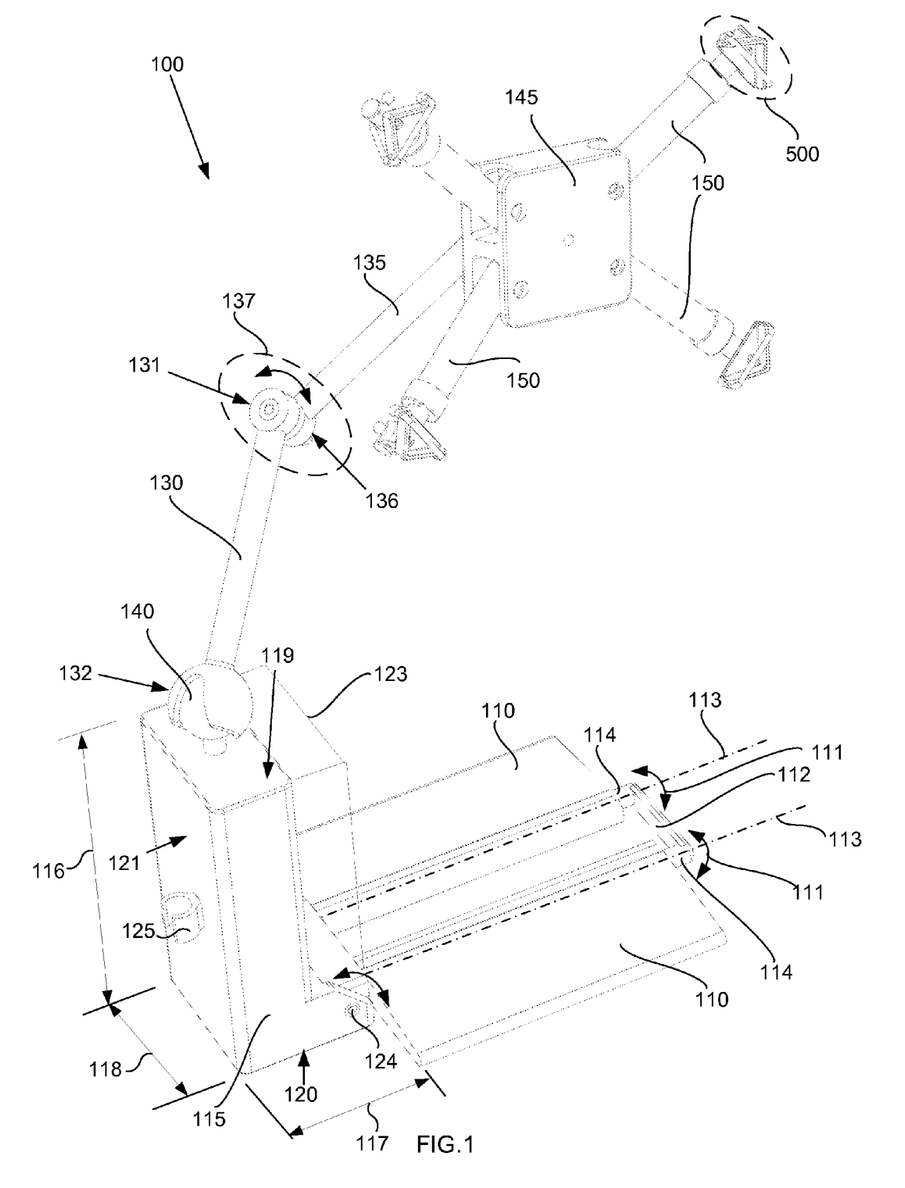
FIG. 1 is a perspective view of the support.
Figure 11:
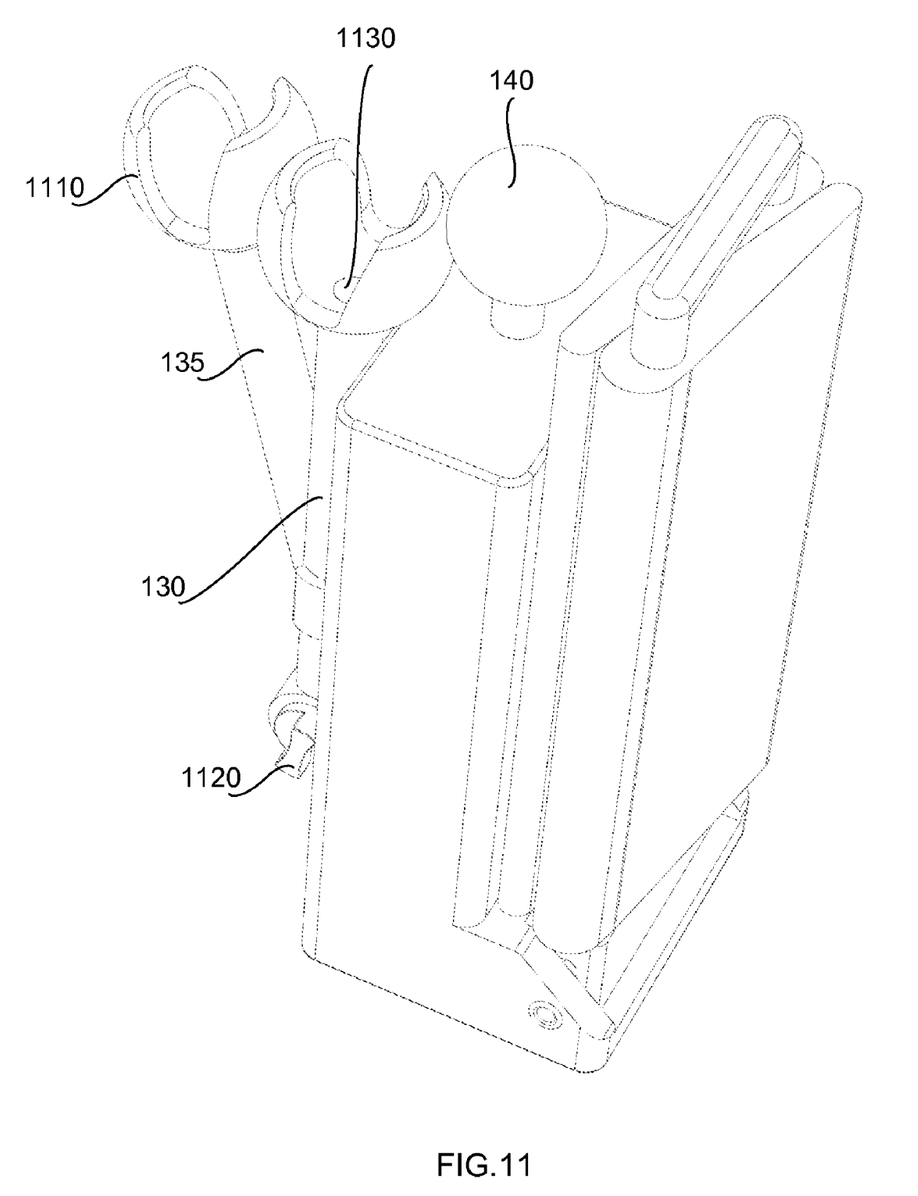
FIG. 11 is a perspective of the base and arms stored in a folded position on the body.

FIG. 1 illustrates a preferred embodiment of the support (100). The components of the support (100) include a base (900) shown in FIG. 9; a body (115); a first arm (130) and a second arm (135); a receptacle (200) shown in FIG. 2; a first ball joint (140); and a second ball joint (320) shown in FIG. 3. The support is intended to be an upright, self-standing device where the base is placed under the legs of a person in a seated position, or under the person's torso for a reclining or supine person. The person's weight on the base is intended to further anchor the support in a comfortable position. Components of the support (100) are adapted to be foldable into a compact state as shown in FIG. 11, so as to enable the support (100) to be used as a portable support for an object, such as a tablet computer. The arms and receptacle provide universal adjustability in holding and supporting a tablet computer or other object in just about any position or orientation.

Figure 9:
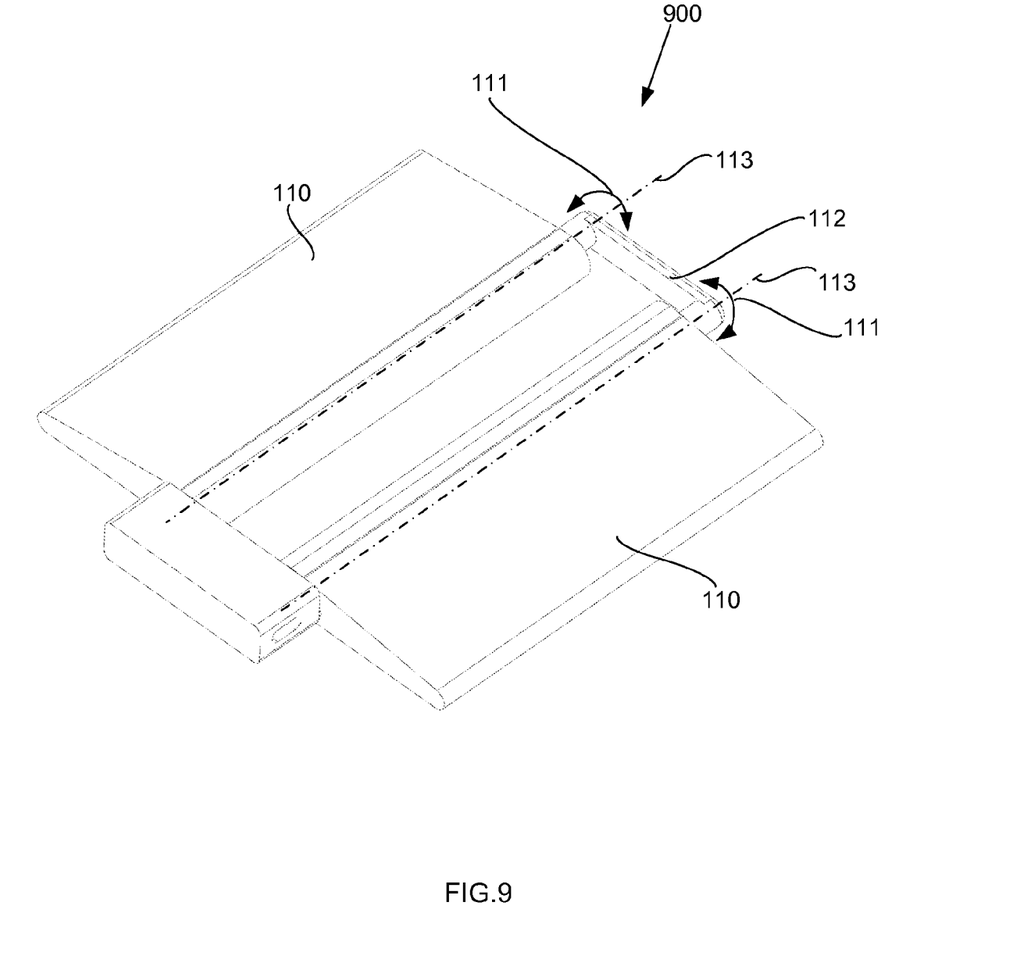
FIG. 9 is a perspective of the base with the wings open.
Figure 10:
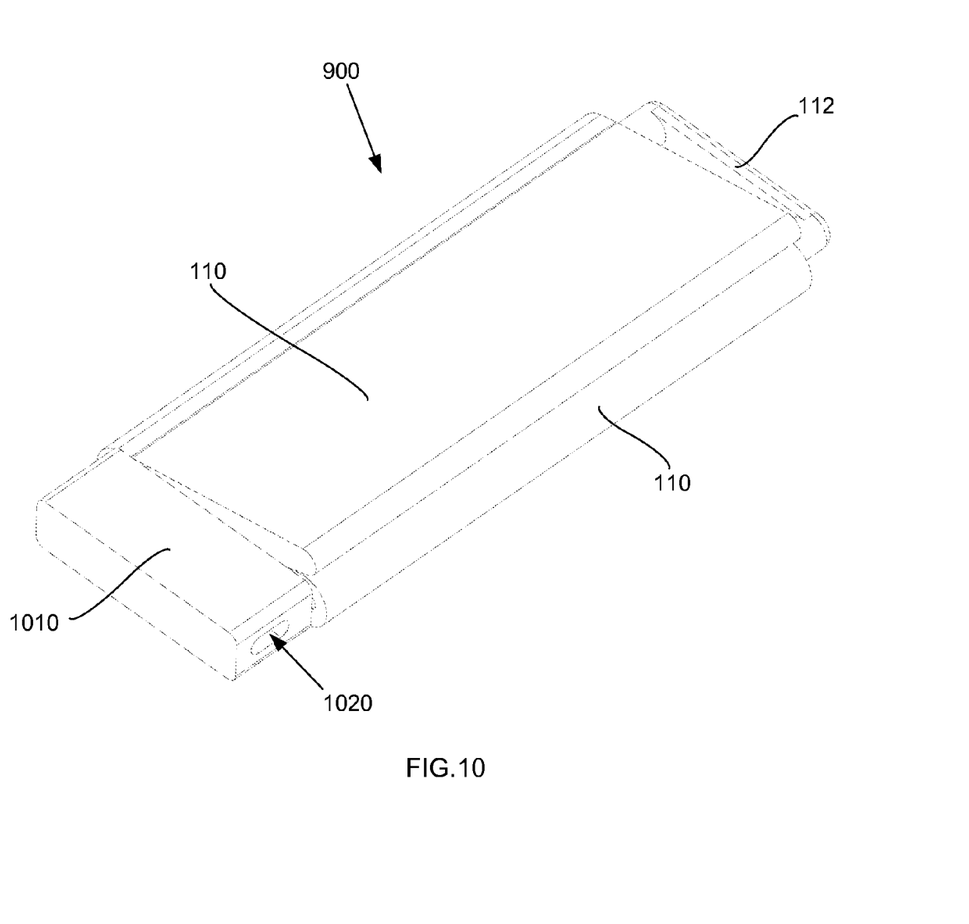
FIG. 10 is a perspective of the base with the wings folded over.

The base (900) includes two wings (110), which are preferably tapered to make it more comfortable for a person laying on the base while in use. Each of the two wings (110) is configured to rotate about 180 degrees (see arrow 111 in FIG. 1) on separate axes (113). Two typical rotatable wing positions are shown in FIG. 9 and FIG. 10. As seen, the wings preferably rotate opposite to each other so that they fold into a compact state. The base (900) may include two separate shafts (114) forming axles on the separate axes (113). When the two separate shafts (114) are present, the base (900) further includes a handle (112) formed by a member connecting the two separate shafts (114).

The base (900) preferably comprises a slotted member (1010). The slotted member (1010) is configured to define a slot (1020) that enables sliding the base (900) inwards into the body (115) to anchor the body (115) and, thus, lock the base (900) in the horizontal position. Thus, the base (900) is adapted to lock into the horizontal position about an axle (124) when the slotted member (1010) is slid into the body (115) after the base (900) is rotated to the approximate horizontal position. While the support (100) will work without such a lock because the leg or torso of the person using it will hold it in place, the support (100) preferably includes such a lock to add rigidity to the support (100). Also an alternative mechanism for locking the base (900) into the approximate horizontal position may be used.

The body (115) is the primary component that defines a free standing three-dimensional shape. In the example shown in the figures, this shape is approximately a rectangular, box-like shape. However, a round, oval, or other three-dimensional shape may be used.

The shape of the body (115) preferably comprises a vertical height (116). A dimensional limitation is generally designated or indicated by double headed arrow, as shown. A surface, side or hole is generally indicated by an arrow. The shape of the body (115) further preferably includes: a depth (117); a width (118); a top side (119) positioned vertically at a distance, that is a height, from a bottom side (120); a rear side (121); and a front side (820).

The body (115) is configured with a recessed portion (123), indicated by the dashed enclosure, along the vertical height (116) on the front side (820) into which the base (900) is attached about a horizontal axle (124).

Figure 8:
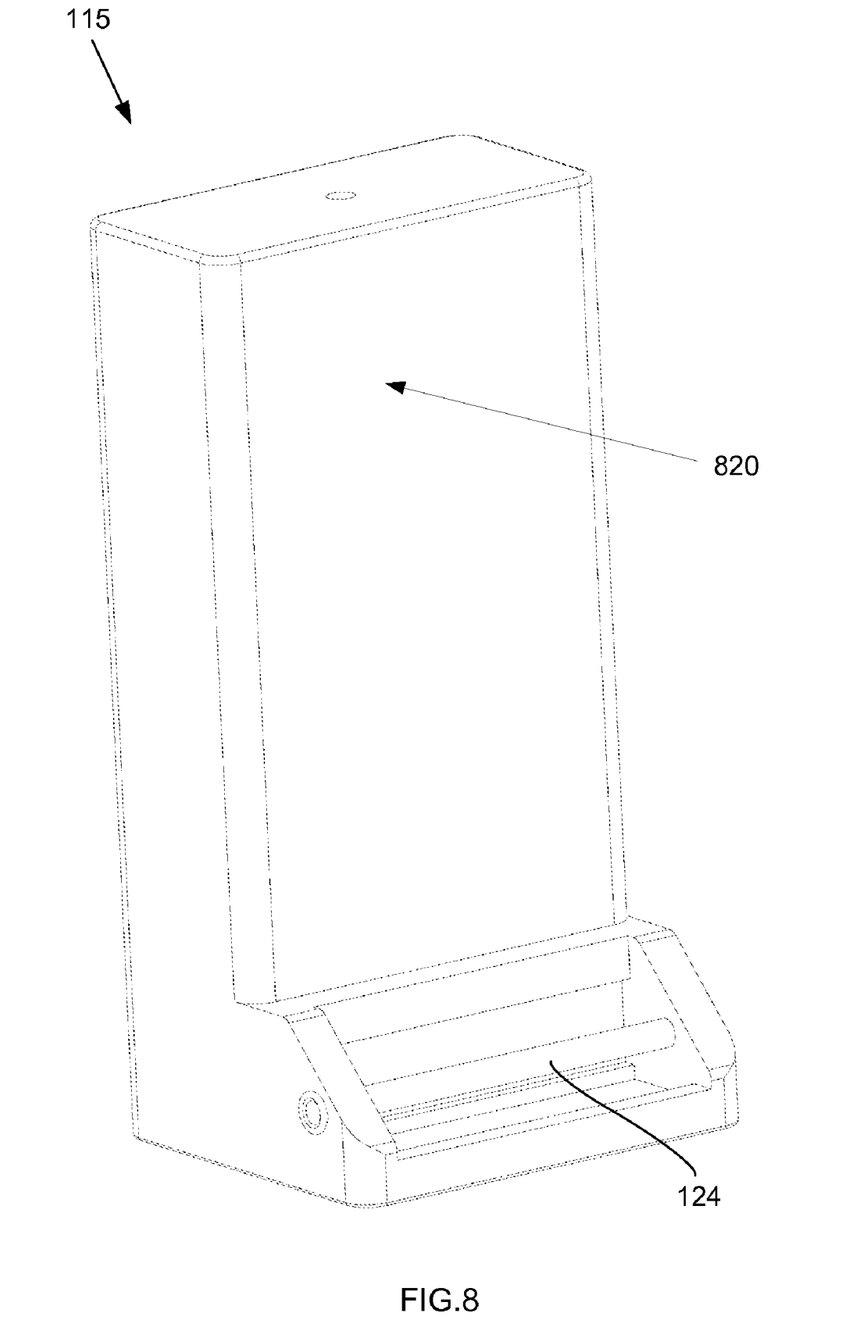
FIG. 8 is a perspective of the body.

FIG. 8 shows a more complete view of the horizontal axle (124). The horizontal axle (124) enables the base (900) to be rotated between an approximate vertical position, which is approximately within the recessed portion (123) and an approximate horizontal position, which is perpendicular to the vertical aspect of the body (115) and adjacent to the bottom side (120), as shown in FIG. 1.

The first arm (130) and the second arm (135) each comprise an elongated shape with a length that exceeds a width, depth or diameter, much like the arm of a person. Each of these arms has a first end, which has a female ball joint receptacle. The first-arm first-end (132) is shown in FIG. 1 and the second-arm first-end (1110) is shown in FIG. 11. Each of these arms also has a pinned end, which preferably includes a cylindrical-type hole where a bearing and pin can be inserted to form or create a pin joint (137) shown within the dashed enclosure. The first-arm pinned end (131) is shown in FIG. 1. The second-arm pinned-end (136) is also shown in FIG. 1.

The first-arm pinned end (131) is connected to the second-arm pinned-end (136) in a configuration that forms a pin joint (137). The pin joint (137) enables rotation of the first arm (130) and the second arm (135) about the pin joint (137). The pin joint (137) is preferably configured with a lock (1120) shown in FIG. 11.

The first-arm first-end (132) is rotatably and removably attachable to the first ball joint (140), and the second-arm first-end (1110) is rotatably and removably attachable to the second ball joint (320).

The lock (1120) is preferably a thumb and forefinger tightening member that when turned, tightens both the pin joint (137) and the two ball joints. As the lock (1120) is turned, it clamps against the pin joint and a beveled thrust washer sending a pin (1130) to engage a ball joint, preferably sending two pins, to engage the ball joints. Friction provided by tightening the lock makes the support a rigid unit. Alternatively, the pin joint (137) or ball joints may be made rigid enough where the lock (1120) for one or all of them is not needed.

Figure 2:
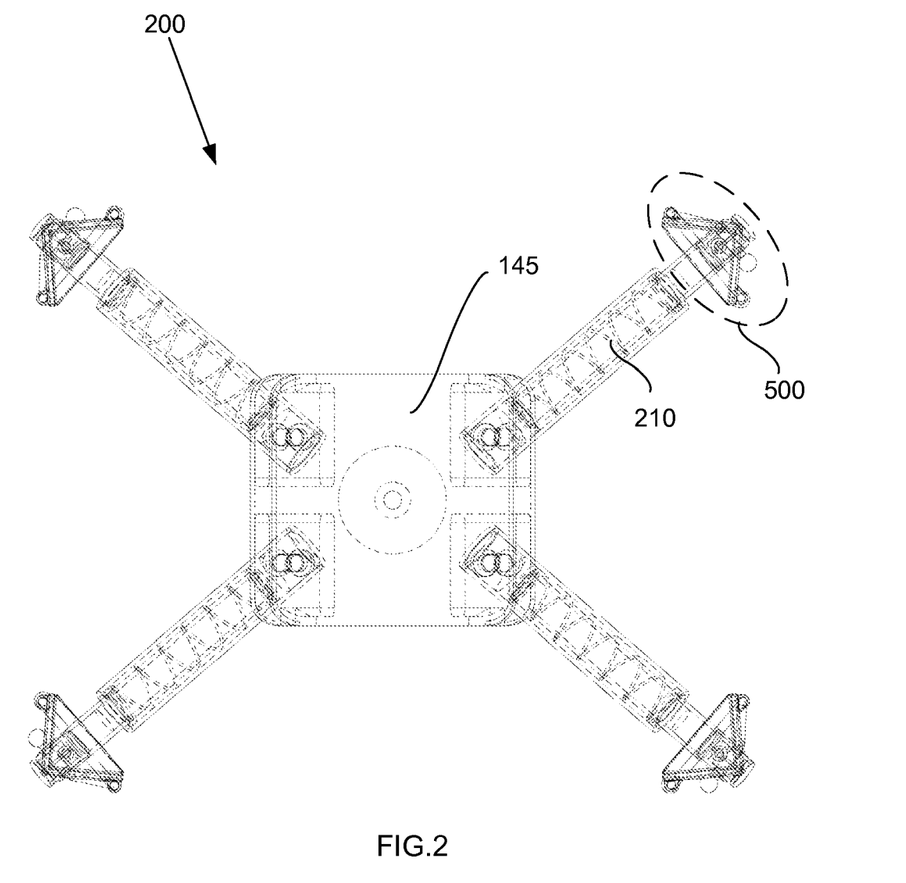
FIG. 2 is a plan view of the receptacle showing hidden components.
Figure 3:
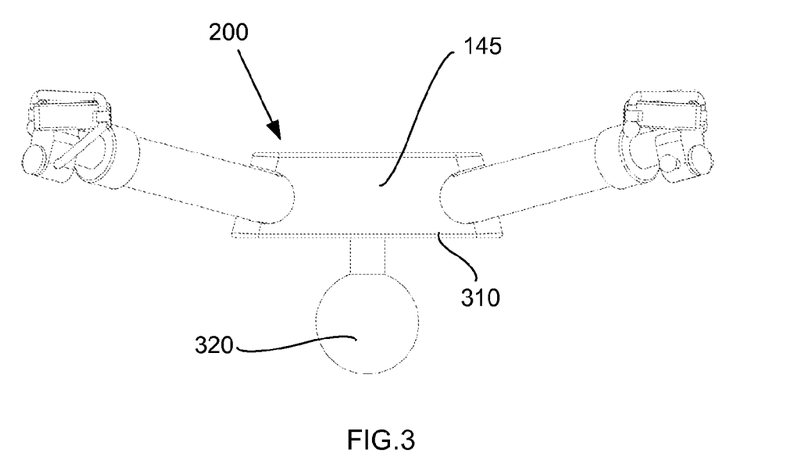
FIG. 3 is a side elevation view of the receptacle.
Figure 4:
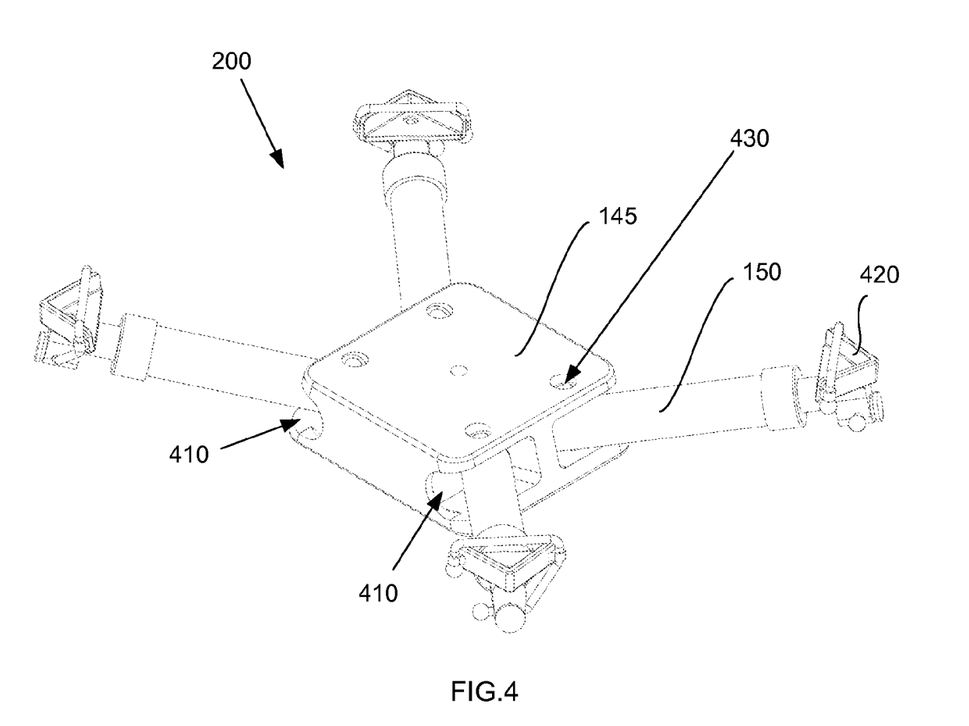
FIG. 4 is a perspective view of the receptacle.

The receptacle (200) includes a frame (145), which is the rectangular, box-like body with a plurality of side openings (410) or holes. The receptacle (200) is also shown in FIG. 2, FIG. 3 and FIG. 4. The frame (145) includes: a rear plate (310); and a plurality of side openings (410), typically one side opening for each rod (150) in a plurality of rods that are part of the receptacle (200).

Figure 6:
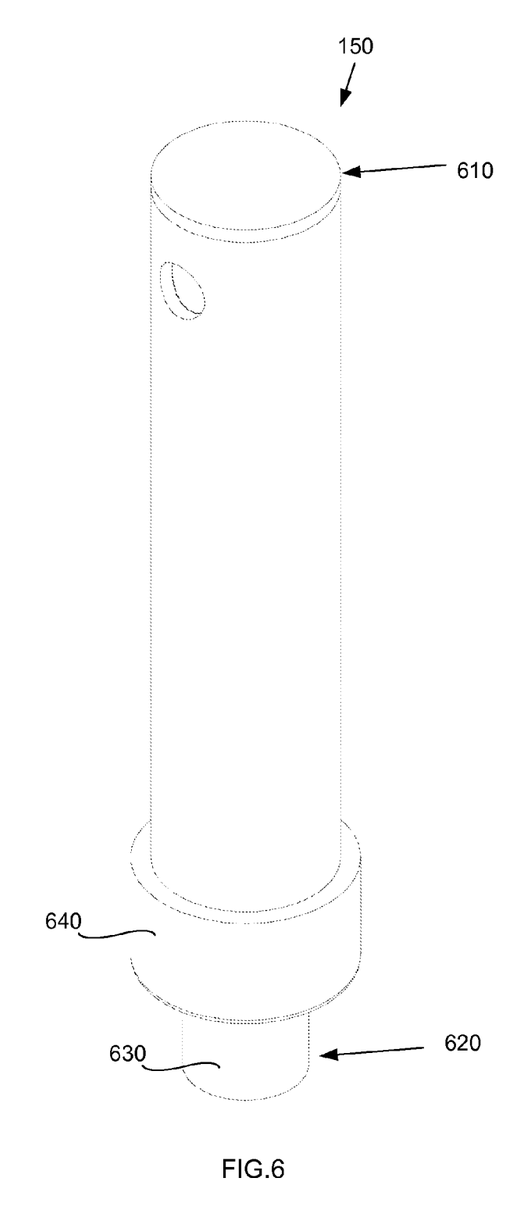
FIG. 6 is a perspective of a rod in the receptacle.
Figure 7:
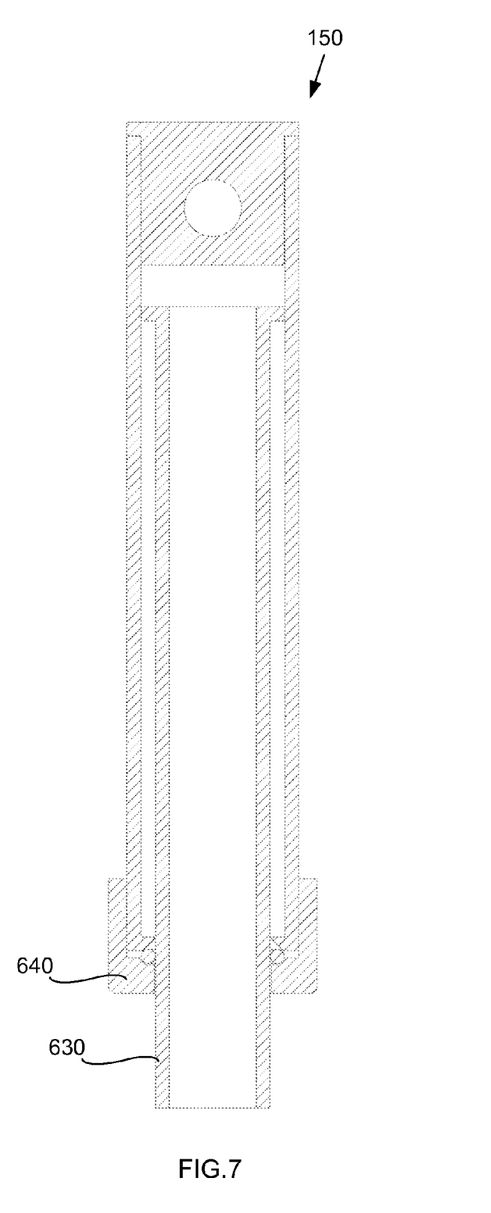
FIG. 7 is a sectional view of a rod in the receptacle.

The receptacle (200) includes a plurality of rods, wherein each rod (150) in the plurality of rods has an elongate shape, that is, a shape where the length is greater in size than the width, depth or diameter. The elongate shape is preferably a tube-shape, or a right-circular cylindrical shape, but any cross-sectional shape, such as rectangular, square, oval, etc., may be used. Each rod (150) comprises a base end (610) and a distal end (620), as shown in FIG. 6. Each rod (150) extends outwardly from a side opening in the plurality of side openings (410). As best seen in FIG. 4, a pin connection (430) at the base end (610) of each rod (150) provides a rotatable attachment to the frame (145). Thus, each rod (150) is rotatably attached to the frame (145).

Preferably, each rod (150) in the plurality of rods comprises a telescoping member (630) adapted to enable lengthening and shortening of each rod (150) and further adapted to lock in position. An annular sleeve (640) rotates to secure the telescoping member in a desired position.

A rod (150) may include a spring (210) to bias the distal end (620) of the rod (150) towards the base end (610). The spring (210) facilitates a quick adjustment of the receptacle to the shape of the object being held.

Figure 5:
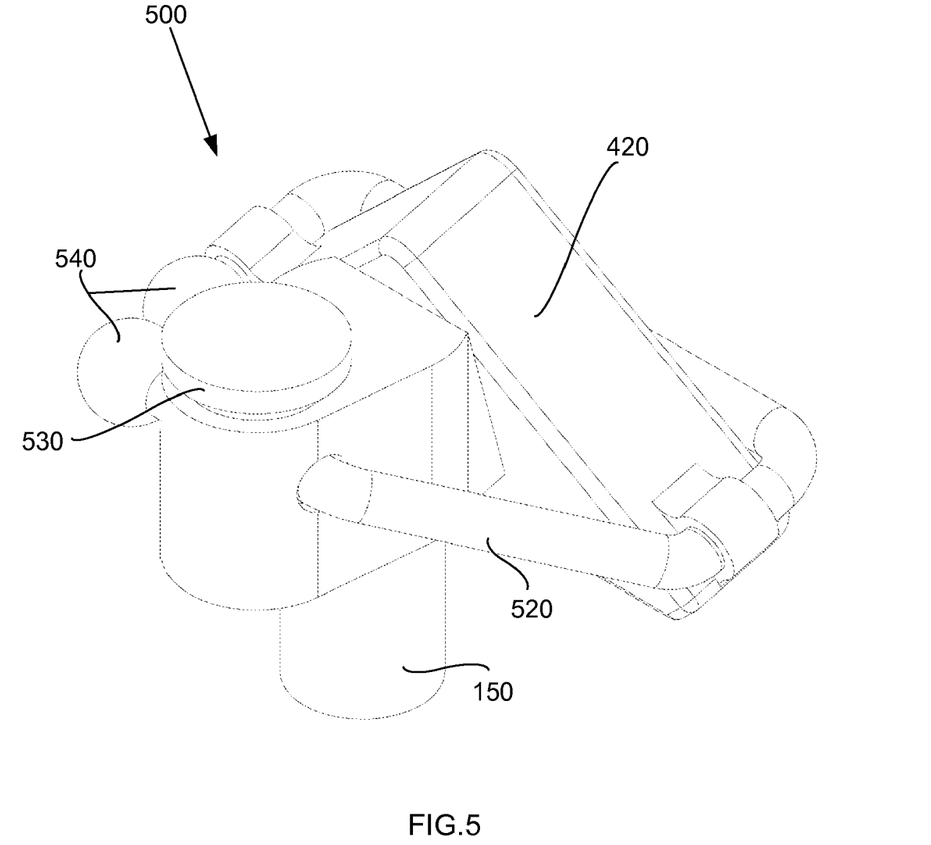
FIG. 5 is a perspective view of the gripper.

The gripper (500) is shown in FIG. 1 within the dashed enclosure and also in FIG. 5. The gripper (500) is mounted to the distal end (620) of each rod (150). The gripper (500) is any device that can be adapted to hold the edges or corners of an object mounted between each rod (150) in the plurality of rods. The preferred embodiment of the gripper (500) is an el-shaped brace (420) rotatably attached to the distal end (620) of a rod (150) in combination with an elastic cord (520). The elastic cord (520) can be pulled over the edge of the tablet computer or other object held by the receptacle (200). The elastic cord (520) may be tensioned or held in place by retaining balls (540) at the ends of the elastic cord (520). A tightening cap (530) may also be used to clamp down on the elastic cord (520) when the elastic cord (520) is pulled to tighten it in securing an object in the receptacle (200).

The first ball joint (140) is attached to the top side (119) of the body (115). The first ball joint (140) comprises a ball that is configured for attachment to the first-arm first-end (132) of the first arm (130). Preferably, the first-arm first-end (132) is rotatably and removably attachable to the first ball joint (140).

The second ball joint (320) is attached to the rear plate (310) of the receptacle (200). The second ball joint (320) comprises a ball that is configured for attachment to the second-arm first-end (1110) of the second arm (135). Preferably, the second-arm first-end (1110) is rotatably and removably attachable to the second ball joint (320).

The support (100) may also include a bracket (125) attached to the rear side (121) of the body (115). The bracket (125) is adapted to hold the two arms after removal from the ball joints. The bracket (125) preferably comprises a snap-in connection that enables holding against the body (115) either the first arm (130) or the second arm (135). Alternative embodiments of a bracket may engage both the first arm (130) and the second arm (135).

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the computer industry.

What is claimed is:

1. A support comprising:
a base comprising two wings, wherein each wing is configured to rotate about 180 degrees on separate axes;
a body configured:
  to define a free standing three-dimensional shape comprising: a vertical height; a depth; a width; a top side positioned vertically at a distance from a bottom side; a rear side; and a front side;
  with a recessed portion along the vertical height on the front side into which the base is attached about a horizontal axle; and
  wherein said horizontal axle enables the base to be rotated between an approximate vertical position approximately within the recess and an approximate horizontal position adjacent to the bottom side;
a first arm and a second arm;
  the first arm comprising:
    an elongate shape;
    a first-arm first-end; and
    a first-arm pinned-end;
  the second arm comprising:
    an elongate shape;
    a second-arm first-end; and
    a second arm pinned-end;
  wherein the first-arm pinned-end is connected to the second arm pinned-end in a configuration that forms a pin joint, said pin joint enabling rotation of the first arm and the second arm about the pin joint;
  wherein the first-arm first-end is rotatably and removably attachable to a first ball joint; and
  wherein the second-arm first-end is rotatably and removably attachable to a second ball joint;
a receptacle comprising:
  a frame, the frame comprising: a rear plate; and a plurality of side openings;
  a plurality of rods, wherein each rod in the plurality of rods has an elongate shape;
  wherein each of said rods comprises a base end and a distal end;
  wherein each of said rods extends outwardly from a side opening in the plurality of side openings; and
  wherein the base end of each of said rods is rotatably attached to the frame;
  a gripper mounted to the distal end of each of said rods, the gripper adapted to hold an edge of an object mounted between the plurality of rods;
wherein the first ball joint is attached to the top side of the body; the first ball joint configured for attachment to the first-arm first-end; and
wherein the second ball joint is attached to the rear plate, the second ball joint configured for attachment to the second-arm first-end wherein the base comprises a slotted member, wherein the base is configured to lock into the approximate horizontal position when the slotted member is slid into the body after the base is rotated to the approximate horizontal position.

2. The support of claim 1, further comprising a bracket attached to rear side of the body adapted to hold the first arm and the second arm after removal from the first ball joint and the second ball joint, respectively.

3. The support of claim 1, wherein each of said rods in the plurality of rods comprises a telescoping member adapted to enable lengthening and shortening of each said rod and further adapted to lock in position.

4. The support of claim 1, wherein at least one rod in the plurality of rods comprises a spring to bias the distal end of said rod towards the base end.

5. The support of claim 1, wherein the gripper comprises an el-shaped brace rotatably attached to the distal end of the rod; and an elastic cord.

6. The support of claim 1, wherein the base comprises two separate shafts forming axles on the separate axes; and wherein the base further comprises a handle formed by a member connecting the separate shafts.

\* \* \* \* \*